Patented Apr. 12, 1927.

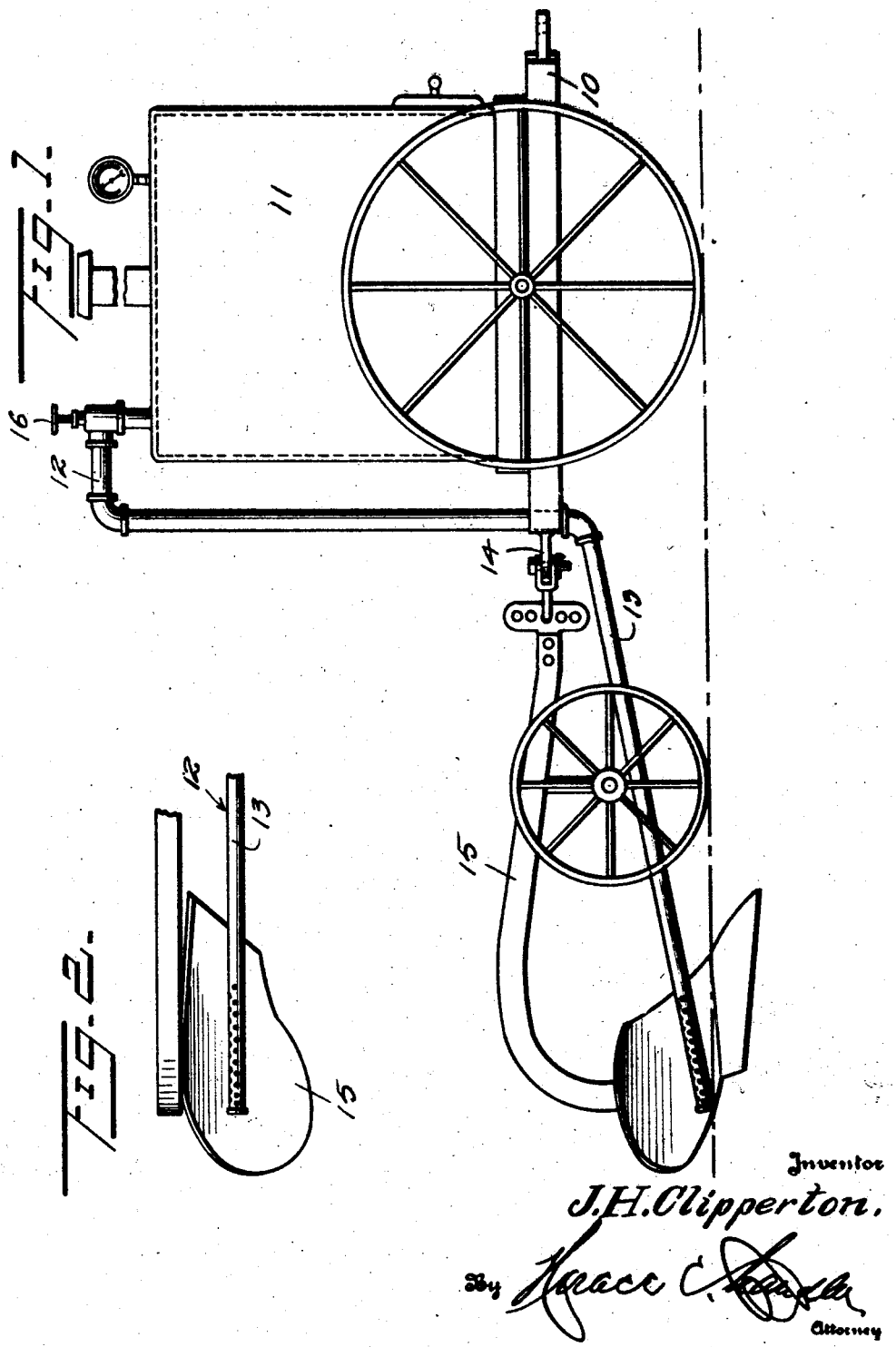

1,624,474

UNITED STATES PATENT OFFICE.

JOHN H. CLIPPERTON, OF WINDOM, MINNESOTA.

GRASS AND WEED DESTROYER.

Application filed February 25, 1926. Serial No. 90,624.

This invention relates to new and useful improvements in grass and weed destroyers, and particularly to devices of this character which are associated with plows or cultivators.

The principal object of the invention is to provide a device by means of which steam is discharged beneath the soil, as said soil is turned over by the plows or cultivator shovels, whereby to kill all undesirable vegetation and the seeds thereof.

Another object is to provide a device of this character by means of which the steam is discharged in front of the plow, and in such position that the plow constantly turns over the soil onto the steam pipe, with the result that the said pipe is, at all times, submerged and arranged to project the steam directly onto the roots of the grass and weeds, as well as the seeds thereof, to effectively destroy the same.

Other objects and advantages will be apparent from the following description when taken in connection with the accompanying drawing.

In the drawing:

Figure 1 is a side elevation of the invention associated with a plow.

Figure 2 is a top plan view of the same.

Referring particularly to the accompanying drawing, 10 represents a suitable wheeled frame, on which is supported the steam generating boiler 11, said boiler having the steam outlet pipe 12 leading from the upper side thereof, and thence downwardly and rearwardly, the latter portion, which is indicated by the numeral 13, being arranged to trail in the soil. The rear of the frame 10 is provided with a suitable draft means 14, to which is hitched the plow 15. It will be particularly noted that the steam pipe section 13, which trails in the soil, is perforated, and is disposed in such position that it will move at the side of the plow whereby to be constantly covered by the soil thrown over by said plow. This pipe section is perforated, as above stated so as to discharge steam below the surface of the soil, directly at the roots of the grass and weeds, as well as seeds of such plants, to cause the instant death thereof. A control valve 16 is disposed in the pipe 12, whereby the operator may regulate the flow of steam from the boiler, into the said pipe.

To the front end of the frame 10 any suitable draft means may be hitched, such as animals, or a tractor.

While I have illustrated a single steam pipe extending from the boiler, into the soil, it will be understood that any number may be employed, whereby to widen the scope of action of the device, such additional pipes being associated with other plows, especially where gangs of plows are used. The main feature of the invention is, however, the projection of steam beneath the loosened soil, and which is maintained beneath the soil by the action of the plow, in turning the soil over on the pipe.

What is claimed is:

A grass and weed destroyer including a soil turning implement having a moldboard, and a perforated steam discharging pipe disposed longitudinally of and within the curvature of the moldboard and spaced therefrom whereby the grassy face of the turf will slide over the steam omitting portion of said pipe as said turf is turned by the moldboard.

In testimony whereof, I affix my signature.

JOHN H. CLIPPERTON.